United States Patent [19]

Vick

[11] 3,878,297
[45] Apr. 15, 1975

[54] METHODS OF RESTORING CARDIAC RHYTHM
[75] Inventor: James A. Vick, Edgewood, Md.
[73] Assignee: Schuyler Development Corporation, Reading, Pa.
[22] Filed: July 2, 1973
[21] Appl. No.: 375,543

[52] U.S. Cl. .................................................. 424/98
[51] Int. Cl. ............................................ A61k 17/00
[58] Field of Search .............................. 424/98, 177

[56] References Cited
OTHER PUBLICATIONS
Habermann et al., Chem. Abst., Vol. 60, (1964), page 13475h.
Wellhoener, Chem. Abst., Vol. 70, (1969), page 56169z.

*Primary Examiner*—Sam Rosen
*Attorney, Agent, or Firm*—Buell, Blenko and Ziesenheim

[57] ABSTRACT

A method of restoring cardiac rhythm is provided by the step of introducing apamin into the cardiovascular system of a body being treated.

4 Claims, 1 Drawing Figure

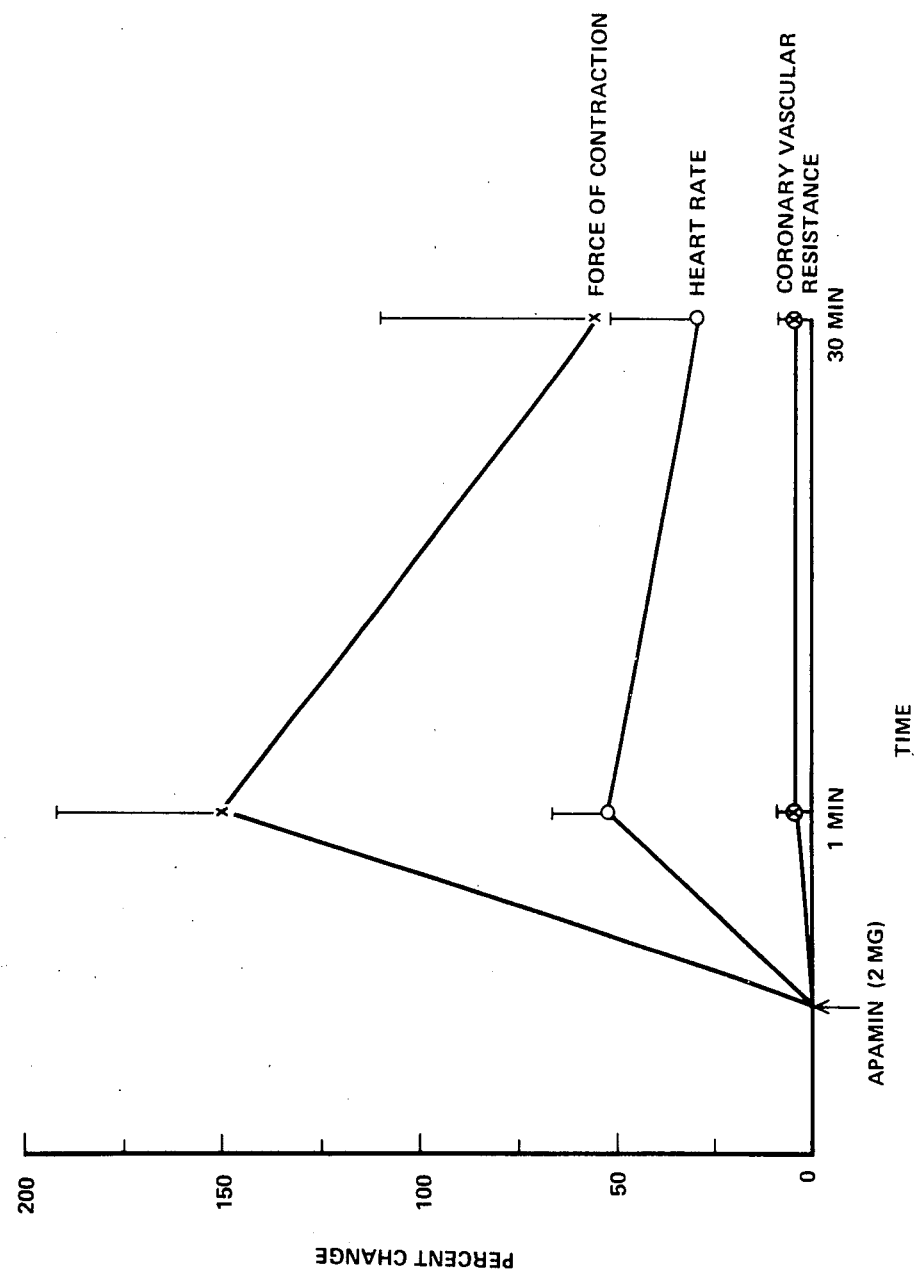
Fig. 1  Percent Change in Force of Contraction, Heart Rate and Coronary Vascular Resistance

METHODS OF RESTORING CARDIAC RHYTHM

This invention relates to methods of restoring cardiac rhythm and particularly to the treatment of arrhythmic problems of the cardiovascular system.

There are many situations where arrhythmic problems of the cardiovascular system arise and must be treated. Certain persons have heart defects which create this particular situation. In others, it arises as the result of accidents, shock and the like.

I have discovered a method of restoring and stabilizing cardiac rhythm which has a more prolonged effect than other anti-arrhythmic compositions. Preferably, I inject into the blood stream a sterile saline solution of apamin which has a marked anti-arrhythmic effect.

Apamin is one of the components which has been isolated from whole bee venom. It makes up about 2 percent of the total bee venom and is less toxic than the major identified components Phospholipase A and Melittin.

The subject matter of this invention can perhaps be best understood by the following examples:

EXAMPLE I

Twenty adult mongrel dogs and ten adult rhesus monkeys were used in the initial portion of the study. Following anesthesia with 30 mg/kg Na pentobarbital I.V. the dogs and monkeys were heparinized with 100 units Na heparin per kg body weight. The animal was then quickly exsanguinated through a catheter placed in the femoral artery and advanced into the distal aorta. This blood was used to prime the reservoir used to perfuse the isolated heart. The chest of the animal was opened using a midline incision and all major branches of the aorta ligated. The heart was quickly removed from the chest, the brachiocephalic trunk catheterized, and the heart perfused with its own blood using a Sigma motor pump. Following a 30-min equilibration period a Walthen Brodie strain gauge arch was sutured to the left ventricle to record force of contraction. Coronary perfusion pressure was monitored with an open ended catheter inserted into the inflow side of the perfusion circuit. EKG and heart rate were recorded using a pair of needle tipped electrodes placed in the myocardial tissue of the right and left ventricles. All recordings were made on a Grass Model 7 polygraph. Apamin was injected directly into the blood perfusing the heart and was allowed to recirculate for the duration of the experiment.

Two dog and two monkey hearts were pretreated with Propranalol (0.5 mg/kg).

Doses of 0.2 mg apamin injected directly into the coronary circulation of the isolated perfused dog heart produced a $50 \pm 10\%$ increase in rate, no change in coronary perfusion pressure and a $150 \pm 50\%$ increase in force. This is illustrated in the accompanying drawing. In the monkey hearts a $65 \pm 8\%$ increase in rate and a $130 \pm 20\%$ increase in force was observed with no change in coronary perfusion pressure. These changes were observed within 3 to 5 minutes following injection and lasted for approximately 30 minutes at which time a gradual decrease in both rate and force occurred, stabilizing at levels well above control for the duration of the experiment (90 minutes).

In approximately 50 percent of the dog and monkey hearts intrinsic arrhythmias were noted immediately following removal of the heart from the chest of the animals, a problem which appears to be inherent to the perfusion procedure. Apamin in the dose described above produced an immediate restoration of normal cardiac rhythm. This apparent anti-arrhythmic action lasted through the entire course of the experiment and was in addition to the observed effects on rate and force. The typical response of the isolated heart to 0.2 mg. apamin is a striking anti-arrhythmic effect as well as an increase in force and rate.

In the two dog and two monkey hearts pretreated with Propranalol the increase in force and rate previously observed were attenuated but not eliminated.

An anti-histaminic (Benadryl), and anti-serotinin (LSD) and an alpha adrenergic blocking agent (phenoxybenzamine) did not alter the response of the heart to apamin.

EXAMPLE II

Six adult mongrel dogs and six adult rhesus monkeys were anesthetized with Na pentobarbital (30 mg/kg) and instrumented for recording of physiological change. Arterial and venous blood pressure, right ventricular pressure, aortic blood flow, EKG, EEG, heart rate and respiratory rate were continuously and simultaneously recorded on a Grass Model 7 polygraph in a manner previously described. Thirty minutes after instrumentation graded doses of apamin (10 ug/kg – 0.1 mg/kg) dissolved in sterile saline were injected into the animals. All injections were made into the femoral vein.

Doses of from 10 ug/kg to 0.1 mg/kg apamin produced at $35 \pm 15\%$ increase in heart rate, a $40 \pm 25\%$ increase in aortic flow and a $50 \pm 40\%$ increase in right ventricular pressure. No significant change in arterial or venous blood pressure, EKG, or cortical electrical activity (EEG) were noted in any of the animals. A slight, but not significant ($10 \pm 8\%$), decrease in arterial pressure was observed which was apparently due to reflex vasodilitation.

The effectiveness of the injection of apamin as an anti-arrhythmic agent is evident from the results of the foregoing examples. The well known beta response of the heart is closely mimicked by low doses of apamin. Significant and long lasting increases in both rate and force are observed without any observed change in coronary perfusion pressure. In that flow in the isolated heart preparation remains constant, a lack of change indicates that this drug does not affect the overall resistance in the coronary vasculature. $R = P/F$, meaning that when Force is constant Resistance is directly related to Pressure. Thus the increase in rate and force noted with apamin is not associated with either a coronary vasoconstriction or vasodilitation. This observation is unique to beta adrenergic drugs in that most cause the coronary vascular resistance of the heart to increase.

The observed anti-arrhythmic action of apamin closely follows the effect of isoproterenol on the heart. In this preparation, the effect of apamin is sustained for 90 minutes, however, while that of a single injection of isoproterenol is relatively short (5 – 10 min). It appears from these examples that apamin could be used for long term anti-arrhythmic properties in other preparations. It would appear that apamin is capable of supporting a decreased cardiac work and preventing a generalized cardiovascular collapse. In this it appears to be far more effective, particularly over extended time periods than any presently known method of treatment.

While I have illustrated certain presently preferred practices of this invention, it will be obvious that the invention may be otherwise practiced within the scope of the following claims.

I claim:

1. A method of restoring cardiac rhythm in animals comprising the step of introducing an effective amount of apamin into the cardiovascular system of the animal being treated.

2. A method of restoring cardiac rhythm as claimed in claim 1 wherein the apamin is injected into an artery.

3. A method of restoring cardiac rhythm as claimed in claim 2 wherein the apamin is dissolved in a sterile saline aqueous solution.

4. A method of restoring cardiac rhythm as claimed in claim 1 wherein the amount of apamin introduced into the system is in the range 10 μg to 0.1 mg per kilogram of body weight.

* * * * *